(12) United States Patent
Baker et al.

(10) Patent No.: US 11,508,015 B1
(45) Date of Patent: Nov. 22, 2022

(54) METHOD AND SYSTEM FOR AUTOMATICALLY DETECTING USE OF AN ALARM SYSTEM

(71) Applicant: UIPCO, LLC, San Antonio, TX (US)

(72) Inventors: Kelly Q. Baker, San Antonio, TX (US); Sumita T. Jonak, San Antonio, TX (US); Will Kerns Maney, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 17/343,313

(22) Filed: Jun. 9, 2021

Related U.S. Application Data

(63) Continuation of application No. 16/424,617, filed on May 29, 2019, now Pat. No. 11,100,590.

(60) Provisional application No. 62/753,108, filed on Oct. 31, 2018.

(51) Int. Cl.
*G06Q 40/08* (2012.01)
*G06N 20/00* (2019.01)

(52) U.S. Cl.
CPC ............. *G06Q 40/08* (2013.01); *G06N 20/00* (2019.01)

(58) Field of Classification Search
CPC ...... G06Q 40/08; G06N 20/00; G08B 25/008; G08B 29/16
See application file for complete search history.

(56) References Cited

U.S. PATENT DOCUMENTS

| | | | |
|---|---|---|---|
| 4,246,573 A | 1/1981 | Kiss | |
| 5,247,564 A | 9/1993 | Zicker | |
| 5,451,925 A | 9/1995 | Le | |
| 7,327,229 B1 | 2/2008 | Nichols et al. | |
| 10,121,207 B1 | 11/2018 | Devereaux et al. | |
| 10,726,500 B1 | 7/2020 | Shah et al. | |
| 2006/0244589 A1 | 11/2006 | Schranz | |
| 2008/0204556 A1 | 8/2008 | de Miranda et al. | |
| 2017/0323389 A1 | 11/2017 | Vavrasek | |
| 2018/0291911 A1 | 10/2018 | Ward et al. | |

*Primary Examiner* — Bennett M Sigmond
*Assistant Examiner* — Marla Hudson
(74) *Attorney, Agent, or Firm* — Plumsea Law Group, LLC

(57) ABSTRACT

A system and method for automatically detecting if a home alarm system is being used and/or actively monitored are disclosed. The system and method use data gathered from one or more sensors, including audio information from microphones. The audio information is analyzed using a machine learning system to determine if the alarm system is being regularly used and monitored. The system and method can also automatically update a policy holder's insurance policy to reflect whether or not an alarm system is being used.

20 Claims, 9 Drawing Sheets

METHOD AND SYSTEM FOR AUTOMATICALLY DETECTING USE OF AN ALARM SYSTEM

CROSS-REFERENCE TO RELATED APPLICATIONS

This application is a continuation of U.S. patent application Ser. No. 16/424,617, filed May 29, 2019 and titled "Method and System for Automatically Detecting Use of An Alarm System" which application claims the benefit of U.S. Provisional Patent Application Ser. No. 62/753,108 filed Oct. 31, 2018, and titled "Method and System for Automatically Detecting Use of An Alarm System," the disclosure of which applications are incorporated by reference herein in their entirety.

TECHNICAL FIELD

The present disclosure generally relates to methods and systems for automatically detecting alarm systems, and in particular to detecting when an alarm system is being used with machine learning.

BACKGROUND

Home owners are often required to have home owner's insurance in the event of damage or loss to the home or its contents. To calculate a home owner's insurance premium, an insurance provider may consider a variety of factors. These can include the cost of the home, the age of the home, its geographic location, susceptibility to various kinds of natural disasters (such as tornados, hurricanes, flooding and earthquakes), as well as other factors.

Having an alarm system on the premises may act as a deterrent for theft. Some insurance providers may therefore offer discounted premiums to home owners with alarm systems. However, conventional discount programs rely on home owners self-reporting the use of alarm systems. And conventional programs do not have a way to confirm that an alarm system is being used (that is, armed and disarmed on a regular basis). Conventional programs also do not have a way to confirm that the system is being monitored by a third party responsible for calling the police, fire department or other rescue workers in the event that an alarm is triggered.

There is a need in the art for a system and method that addresses the shortcomings discussed above.

SUMMARY

In one aspect, a method of determining if an alarm system associated with a premises is being used, where the premises is associated with an insurance policy, includes the steps of retrieving sensory information from a sensory device disposed proximally to the premises and analyzing the sensory information to detect an alarm arming event. The method also includes sending a message to an owner of the insurance policy when no alarm arming event has been detected within a predetermined period.

In another aspect, a method of determining if an alarm system associated with a premises is being used, where the premises is associated with an insurance policy, includes the steps of receiving information from a motion sensor disposed proximally to an entrance of the premises, activating a microphone for a predetermined interval in response to information from the motion sensor and retrieving audio information from the microphone. The method also includes the steps of analyzing the audio information to detect an alarm arming event and sending a message to an owner of the insurance policy when no alarm arming event has been detected within a predetermined period.

In another aspect, a method of determining if an alarm system associated with a premises is being used, where the premises is associated with an insurance policy, includes the steps of retrieving sensory information from a sensory device disposed proximally to the premises and analyzing the sensory information to detect an alarm arming event. The method also includes a step of automatically updating the insurance policy when at least one alarm arming event has been detected within a predetermined period.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide system and methods for automatically detecting whether an alarm system on a premises is being used and/or being actively monitored by a third party (such as a monitoring company). When the alarm system is not being used and/or monitored, the system may automatically send an owner of an insurance policy a message. If the owner is already receiving a discount, the message may include a reminder to use the alarm system more frequently so that they can remain eligible for the discount. If the owner is not already receiving a discount, the message may inform the owner that they are eligible for a discount. In some cases, the system can automatically adjust the insurance policy to reflect a discount.

Alarm system use and monitoring can be detected by analyzing audio information received from one or more microphones on the premises. The audio information can be analyzed using a machine learning system to detect key phrases and sounds associated with arming/disarming the alarm system as well as phrases and sounds associated with active monitoring. By automatically detecting use and monitoring of an alarm system, the system and method can help an insurance provider save costs by ensuring discounts are only given to customers who are actively using their alarm systems and/or having those systems monitored. The system can also improve customer satisfaction by automatically adjusting insurance policies to reflect discounts for using an alarm system, even in situations where the policy holder was unaware of such discounts ahead of time.

Figure 1:
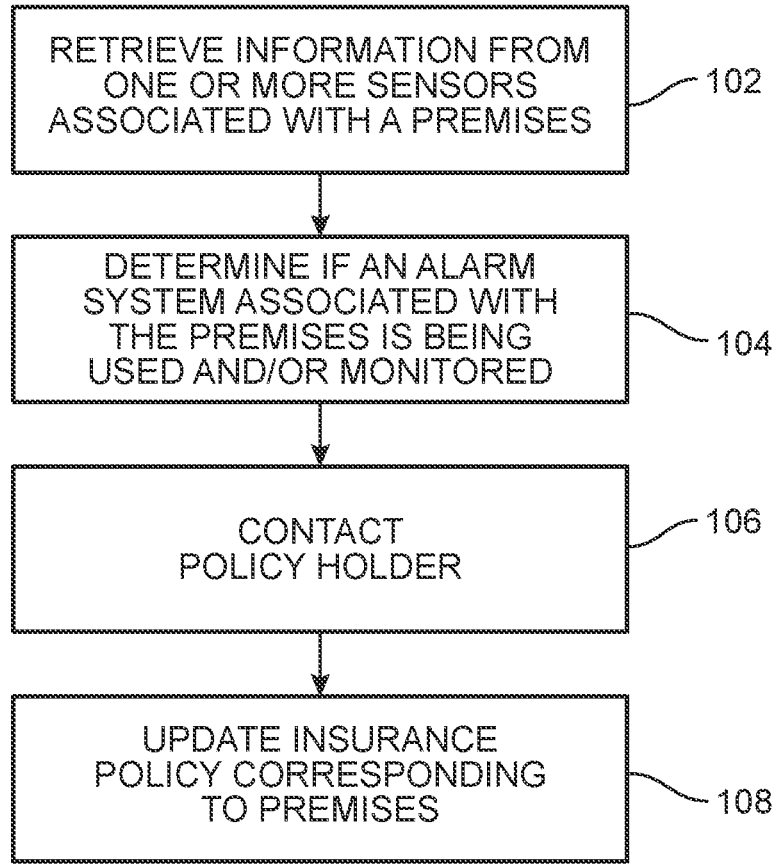
FIG. 1 is a schematic view of a process for detecting if an alarm system on a premises is being used and/or monitored, according to an embodiment.

FIG. 1 is a schematic view of a process for detecting if an alarm system associated with a premises is being used and/or monitored and also updating an insurance policy associated with the premises, according to an embodiment. As used herein, the term "premises" refers to a plot of land and any buildings or other structures on the land.

In the present embodiment, one or more of the steps in this process may be performed by an insurance provider. The term "insurance provider" (or simply "provider"), as used herein refers to any institutions or companies that provide insurance products. Insurance products can include home owner's insurance, renter's insurance and/or commercial property insurance as well as vehicle insurance. An insurance product may be characterized by an insurance policy, which is a contract between an insurance provider (the "insurer") and a policy holder (the "insured"). In some cases, the policy holder may be an owner, or tenant, of a premises. The policy holder may also be referred to as a customer of the insurance provider.

In step 102, a provider may retrieve information from one or more sensors associated with a premises. The type of sensors could vary, and may generally include optical based sensors (for example, cameras), audible based sensors (for example, microphones), tactile based sensors as well as electrical sensors, temperature sensors, humidity sensors, motion sensors, as well as other suitable sensors.

Next, in step 104, the information from the one or more sensors may be used to determine if an alarm system associated with the premises is being used and/or monitored. More specifically, this step may include determining if the alarm system is being used with sufficient frequency. In some cases, the provider may check that the alarm system is being used at least once within a predetermined period, such as once a day or once a week.

In step 106, the provider may contact the policy holder. For example, a policy holder who is already receiving a discount on their insurance premium may receive reminders when the provider determines that they are not using their alarm system sufficiently frequently or when the alarm system is not being monitored. As another example, a policy holder who is not already receiving discounts may receive information about insurance premium discounts when the insurance provider detects that the policy holder is using their alarm system with sufficient frequency or detects that the alarm system is being monitored.

In step 108, the provider may update an insurance policy, and/or records associated with the insurance policy, corresponding to the premises based on the detected information about the alarm system. In some cases, the provider could automatically remove discounts for use of an alarm system when that alarm system is not being used sufficiently frequently. In other cases, the provider could automatically add discounts for use of an alarm system when the alarm system is being used sufficiently frequently (and when the discount has not previously been applied to the insurance policy).

Figure 2:
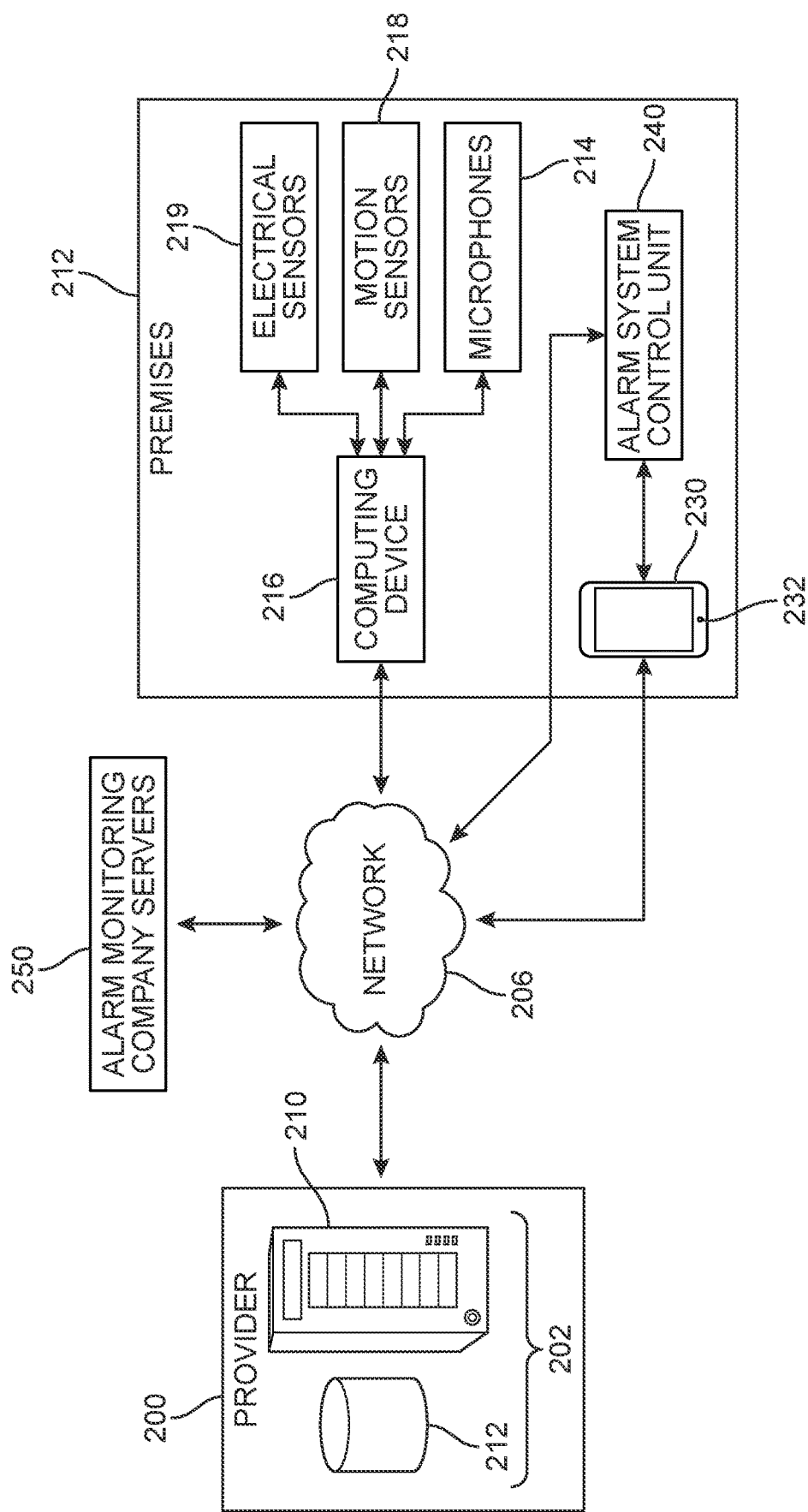
FIG. 2 is a schematic view of a system for receiving sensed information and analyzing the information to detect alarm system use and monitoring, according to an embodiment.

FIG. 2 is a schematic view of many of the systems and devices that may be used to extract sensory data associated with a premises. Referring to FIG. 2, provider 200 may comprise a centralized computer system 202. The term "computer system" refers to the computing resources of a single computer, the partial computing resources of a single computer, a plurality of computers communicating with one another, or a network of remote servers. In an exemplary embodiment, computer system 202 includes at least one server.

In the embodiment of FIG. 2, centralized computing system 202 comprises one or more computing devices 210 (for example, a server) that may be in communication with one or more databases 212. Computing device 210 may include one or more processors and a non-transitory computer readable medium. Instructions stored on the non-transitory computer readable medium may be executed by the one or more processors. Databases 212 could be co-located with computing device 210 or could be remote databases that are accessible by computing device 210 over network 206. Databases 212 can include any kind of storage devices, including but not limited magnetic, optical, magneto-optical, and/or memory, including volatile memory and non-volatile memory.

Provider 200, including computer system 202, may communicate with one or more sensory devices located at premises 212. Here, premises 212 may be associated with a particular home, apartment, building or other kind of property that is insured by provider 200. Referring to FIG. 2, a premises 212 could include a computing device 216 connected to a plurality of sensory devices. Specifically, computing device 216 can be connected with one or more microphones 214, one or more motion sensors 218 and one or more electrical sensors 219. These devices may be connected to computing device 216 in a wired or wireless manner.

Computing device 216 may include a processor, storage and a communications module for communicating with computer system 202. In some cases, communication between computing device 216 and computer system 202 may occur over a network 206. Alternative, in some cases, one or more sensory devices may communicate directly with provider 200 over network 206, rather than communicating via computing device 216.

Figure 3:
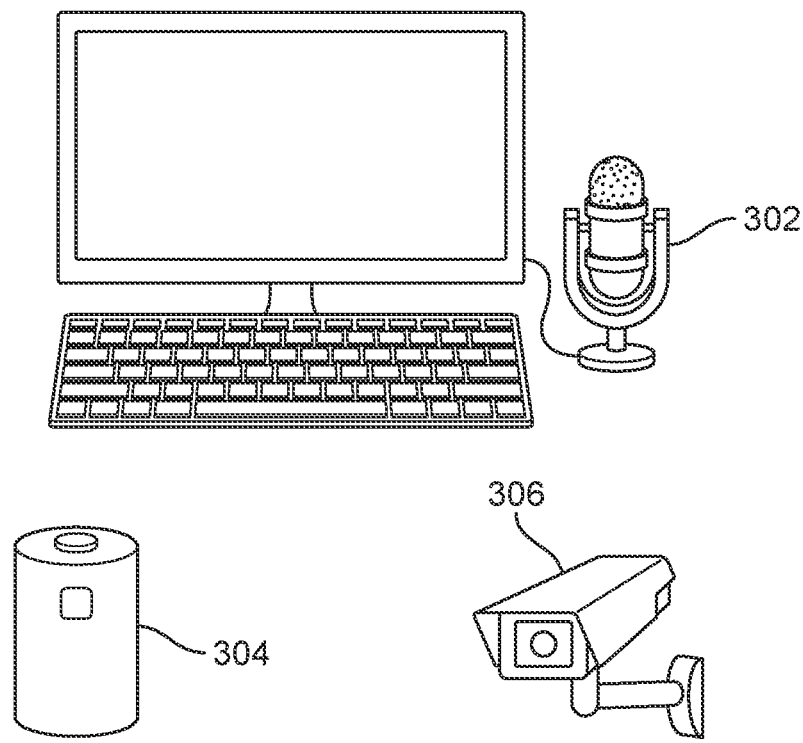
FIG. 3 is a schematic view of various devices including microphones that could be used with the exemplary system of FIG. 2.

Microphones 214 could comprise any kind of microphones. Several exemplary types of microphones are depicted schematically in FIG. 3. Referring to FIG. 3, a premises could include a computer microphone 302 associated with a desktop PC, laptop or other computing device on the premises. In some cases, computer microphone 302 could be associated with a web camera. A premises could also include an intelligent voice assistant 304 with an embedded microphone. Intelligent voice assistants may be any intelligent devices that receive audible commands and provide audible responses. These devices typically include very high quality microphones for purposes of picking up audible commands from users who may be disposed far from the device. A premises could also include a security camera 306 with an embedded microphone. In some other embodiments, microphones could be located internally or externally to structures of a premises for purposes of detecting ambient noise.

Referring back to FIG. 2, microphones 214 may be capable of transmitting audio information to computing device 216, or directly to provider 200 over network 206. The audio information could be configured in any data format including, but not limited to: uncompressed audio formats, such as WAV, AIFF and AU; formats with lossless compression such as FLAC, WavPack and TTA; and formats with lossy compression, such as Opus, MP3, and WMAL.

Motion sensors 218 could comprise any kinds of motions sensors known in the art. These may include, but are not limited to: passive infrared sensors, microwave sensors, and ultrasonic sensors. Motion sensors could be deployed at selective locations. In some embodiments, one or more motion sensors 218 may be disposed proximally to any door or other entrance/exit of premises 212, to provide information about when someone is entering or exiting the premises.

Electrical sensors 219 could comprise various kinds of sensors for detecting electrical activity in one or more components of an alarm system. For example, potentiometers, or devices for measuring current, could be connected to one or more components of an alarm system to detect when the one or more components are active, and thus, when the alarm system may be armed, or at least switched on. In some cases, patterns of electricity use associated with the one or more components could be used to infer the status of an alarm system (for example, whether the system is "on" or "off", or whether it is "armed" or "disarmed").

Provider 200 could also communicate with a user device 230, which may be carried by onto premises 212. User device 230 may comprise a computer system for processing and communicating information. A user device may generally include a processor, a data storage component, and a display. A user device may also include components to facilitate communication with external systems (for example, hardware and software components to enable communication over network 206). In some cases, a user device includes one or more physical buttons. In some cases, a user device includes touchscreen controls.

User device 230 may include a microphone 232. Microphone 232 may capture audio information. Microphone 232 may be capable of storing and transferring audio information in any known formats, including those discussed above. Additionally, user device 230 could include additional sensors including, but not limited to: accelerometers, gyroscopes, magnetometers, GPS receivers, barometers, proximity sensors and ambient light sensors.

In the exemplary embodiment of FIG. 2, user device 230 comprises a mobile device. Specifically, user device 230 comprises smartphone. In other embodiments, user device 230 could be a tablet computing device. In still other embodiments, however, a remote device could comprise a laptop, a desktop computer, or similar kind of device.

Both user device 230 and computing device 216 could operate in a client-server relationship with computer system 202 of provider 200. For example, computer system 202 may include a server that communicates with user device 230 as well as computer device 216 over network 206. User device 230 and/or computing device 216 may run client software to control one or more microphones, retrieve audio information from those microphones, store audio information and/or send audio information to computer system 202 for analysis. In addition, messages may be automatically sent to user device 230 to inform them of changes to their policy and/or to request further action regarding their policy.

Premises 212 may also include an alarm system control unit 240, also referred to simply as "control unit 240". Control unit 240 may provide a centralized hub of an alarm system. Control unit 240 can include a user interface for arming/disarming the system, for communicating with a monitoring company or 911 operator, and for configuring various settings of the alarm system. Control unit 240 may include speakers to generate noises (i.e., an alarm), as well as verbal commands/messages. For example, many alarm systems provide a verbal confirmation when a system is armed or disarmed so that the user knows the state of the system (and doesn't accidentally trigger it). In some cases, control unit 240 can also provide a microphone along with speakers for communicating with an operator of a monitoring company. For example, when an alarm is triggered the monitoring company may call the user to check if the alarm should be ignored. In some cases, this call may go through to a user's cell phone. In other cases, this call may go through a speakerphone associated with control unit 240, or a related component of the alarm system.

Control unit 240 may itself communicate with an alarm monitoring company's servers 250 through network 206. In some embodiments, control unit 240 may also communicate with user device 230, for example, through a web interface that allows users of the alarm system to change the alarm system settings and/or arm/disarm the system remotely.

In some embodiments, provider 200 may also be configured to communicate directly with servers 250 of alarm monitoring company. As discussed in further detail below, in some cases, provider 200 may have permission to request information about a user's account. In some cases, provider 200 may be authorized to have the monitoring company confirm if the user's alarm system is being actively monitored.

Figure 4:
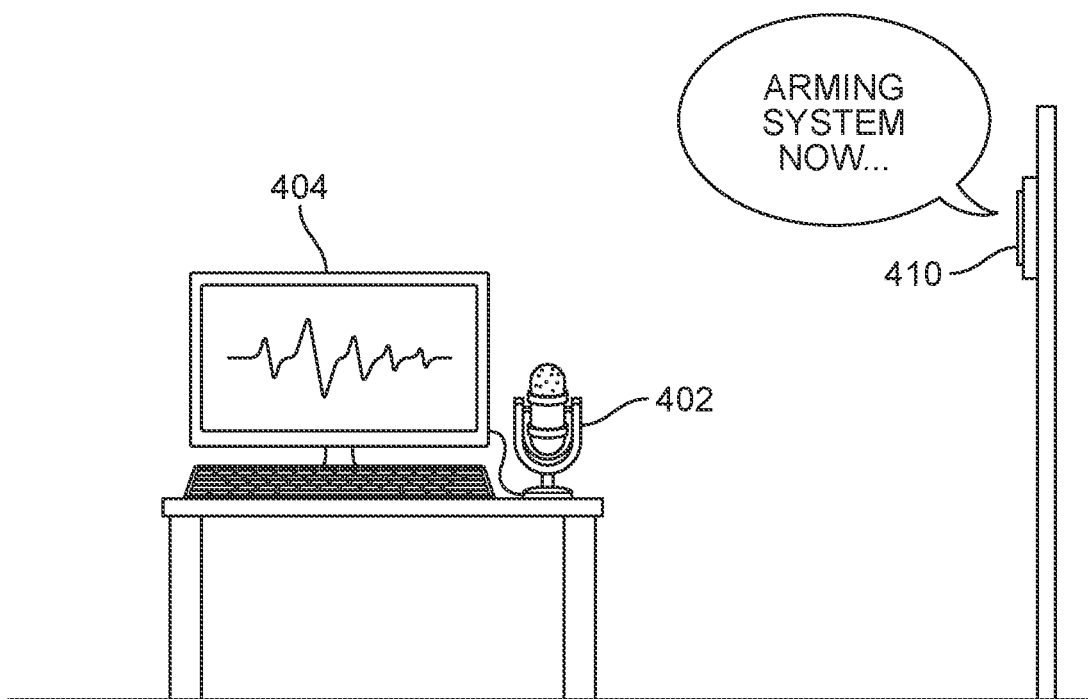
FIG. 4 is a schematic view of a situation where an alarm system control panel is announcing an arming event that is detected by a proximally located microphone, according to an embodiment.

FIG. 4 depicts a schematic configuration in which a microphone 402 is connected to a home computer 404 within a premises 406. As seen in FIG. 4, microphone 402 may be near an alarm system control panel 410. As the alarm system is armed by a homeowner, alarm system control panel 410 provides an audible alert that the alarm system is being armed. This kind of alert is commonly provided to homeowners to remind them that once armed, anytime a door is opened the homeowner will need to disarm the system or else an alarm will sound. This audible alert may be picked up by microphone 402, stored on home computer 404, and sent to computing system 202 (not shown) for further analysis. It may be appreciated that FIG. 4 is only one example of a configuration where a microphone within a premises can capture audio information associated with an alarm system. In other embodiments, audio information could be captured by microphones in a voice assistant, microphones in a security camera, microphones in a user device (such as a cell phone), as well any other microphones that may be located within, or proximally to, a premises.

Figure 5:
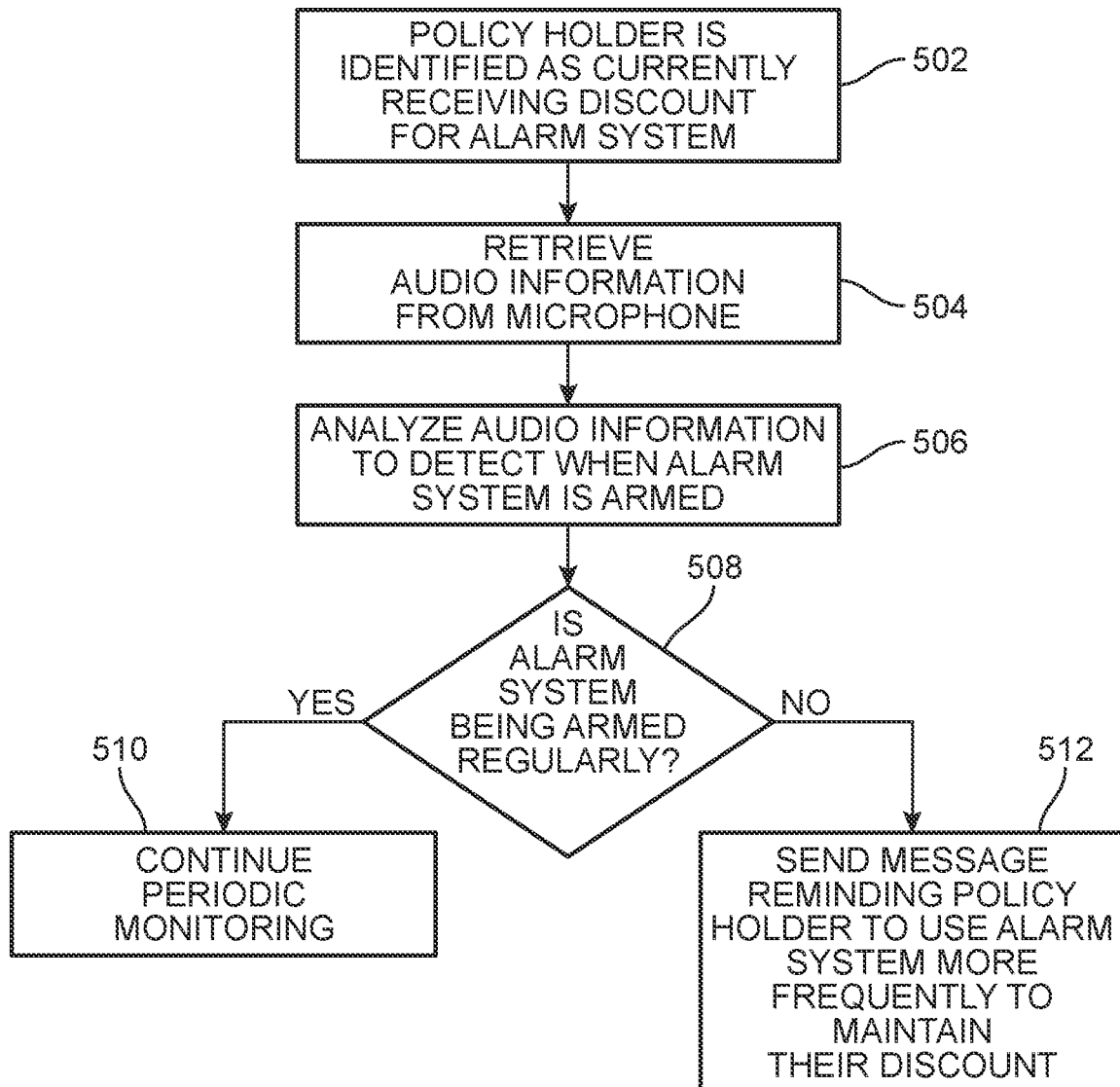
FIG. 5 is a schematic view of a process for confirming that an alarm system is being used regularly, according to an embodiment.

FIG. 5 is a schematic process for automatically detecting if an alarm system is being used for a policy holder who is already receiving a discount. For convenience, the following steps are described as being performed by a computing system operated by provider (e.g., provider 200 in FIG. 2). However, it may be appreciated that some of these steps can be performed by one or more systems operated by another entity. In one embodiment, the following steps can be performed by software running on a computing system (e.g., computing system 202) that is maintained by a provider (e.g., provider 200).

In step 502, a computing system identifies a policy holder as already receiving a discount for using their alarm system. Next, in step 504 the computing system may retrieve audio information from a microphone located on the premises. For example, audio information captured by a microphone (e.g., microphones 214 of FIG. 2) could be sent directly to a provider over a network (e.g., network 206). In some other cases, image information could be relayed to a provider through an intermediate computing device (e.g., computing device 216). Alternatively, in another embodiment, a computing system may retrieve audio information from a microphone 232 of a user device 230.

Next, in step 506, audio information could be analyzed to detect an alarm arming event. Here, the term "alarm arming event" refers to a transition between an unarmed and armed state of the alarm system. Alarm arming events are typically associated with one more audible sounds. These may include beeps and other non-verbal noises, as well as verbal announcements. As one example, an alarm system may announce "system arming in 30 seconds" after a user has initiated the arming event.

Analyzing the audio information may include using one or more machine learning algorithms. Techniques from artificial intelligence and machine learning could be used for detecting sounds, key words or key phrases known to be generated during an alarm arming event. As one example, techniques from the field of Natural Language Processing (NLP) could be used. In some cases, techniques from speech recognition could be used.

In some embodiments, the output of the analysis performed during step 506 can be characterized as a "arming event parameter". This parameter could represent an explicit classification category, such as "alarm event detected," or "no alarm event detected." Alternatively, this parameter could be a number (such as a decimal or percentage) representing the probability that an arming event has been detected. For example, if a classification algorithm outputs the number 0.8, this may indicate that there is an 80% chance that an arming event has been detected from audio information recorded at the premises. A suitable classification parameter can be selected according to the type of machine learning algorithm that is used.

In step 508, the computing system determines if an alarm system on the premises is being armed sufficiently regularly. This may include monitoring the alarm system for some period, detecting one or more alarm arming events, and then determining if the frequency of the arming events is sufficient. In some cases, the number of arming events detected over a predetermined time could be compared to a threshold frequency.

If the alarm system is being armed regularly, the computing system may proceed to step 510. At step 510, the computing system can continue periodic monitoring of the alarm system to ensure it continues to be used sufficiently frequently.

If the alarm system is not being armed regularly, the computing system may proceed to step 512. At step 512, the computing system may send a message to the policy holder. This message can include a reminder to use the alarm system more frequently to maintain the current discount on their insurance policy (that is, on their premium or their deductible). This message could be provided via text, email or even a call placed by a representative. In some embodiments, the message could be pushed to a mobile device through an application supported by the insurance provider.

Because alarm systems do not produce noise continuously, periodic monitoring is necessary to ensure that the system is not missing instances where the alarm system is being armed and disarmed. As an example, a system could be set to continuously monitor audio information from a premises for 12 hours or 24 hours at a time to determine if the alarm system is armed or disarmed during this period. In some embodiments, a system could also retrieve location information that is monitored by user device 230 to confirm that the period of audio monitoring includes several instances where a user is entering/exiting the premises.

In some cases, it may be undesirable to continuously monitor audio information from a premises, even for shorter intervals of time (several hours, for example). In some embodiments, therefore, it may be desirable to have a way of triggering the recording of information when it is likely that a homeowner is arming or disarming an alarm system. In one embodiment, a system can make use of motion sensors in a home to infer times when a homeowner is entering or exiting a premises and record audio information only at those times.

Figure 6:
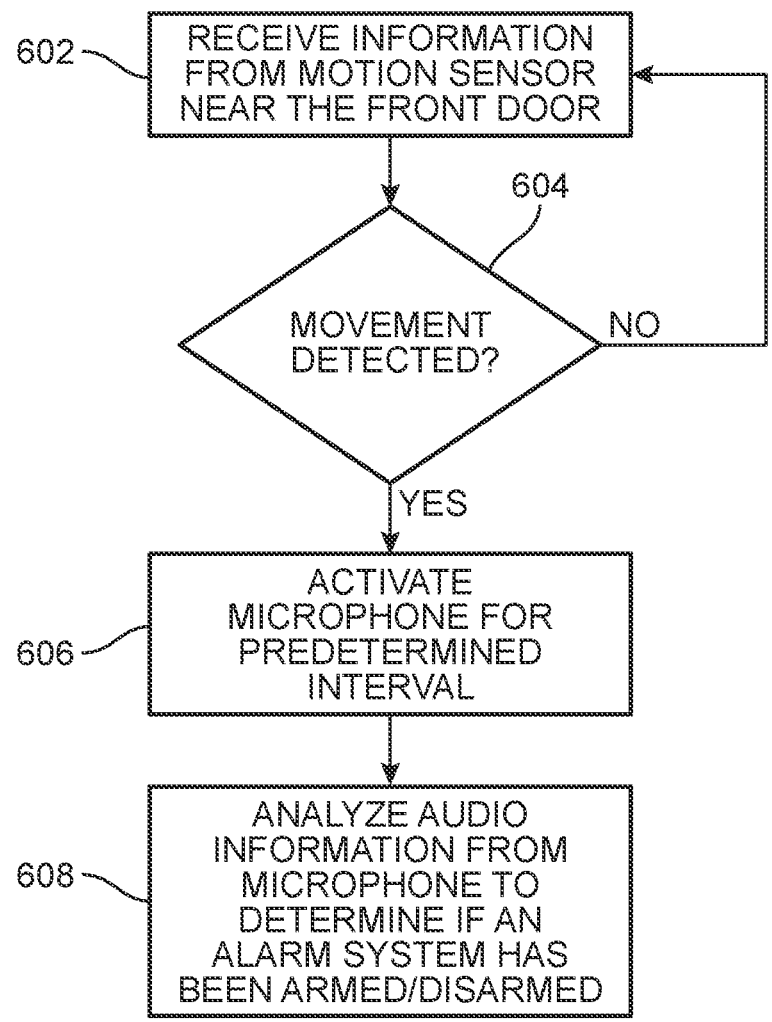
FIG. 6 is a schematic view of another process for confirming that an alarm system is being used regularly, according to an embodiment.

FIG. 6 is an embodiment of a process where information from a motion sensor is used to trigger when a microphone is activated. In a step 602, the computing system may receive information from a motion sensor disposed proximally to a front door. Next, in step 604, sensory information from the motion sensor is analyzed to determine if movement has been detected. Here, movement is used as an indicator that a user might be entering or exiting the premises, since the motion sensor is disposed proximally to the door.

If movement has been detected, the system continues to step 606. Otherwise, the system returns to step 604 to continue receiving information from the motion sensor.

If movement is detected, the system may activate one or more microphones (e.g., microphones 214) for a predetermined interval. The length of the predetermined interval could be selected according to various criteria, including the desire to minimize the amount of time that the microphones are active so as to not interfere with customer privacy. In one embodiment, the predetermined interval would be one that is the shortest possible interval of monitoring that maintains a relatively high success rate for correctly detecting whether an arming event has occurred.

In step 608, the computing system may analyze audio information from one or more microphones to determine if an alarm system has been armed or disarmed. Depending on the results of the analysis, the system could perform additional steps, including some of the steps described above with respect to the process shown in FIG. 5.

If the audible information expected from an alarm system during an arming or disarming event is fairly consistent and simple, the exemplary system may be configured to passively monitor audio information until a specific sound, word, or set of sounds and/or words trigger the system. In this alternative mode of operation, software running on a local computing device, such as an intelligent voice assistant, would monitor incoming audio information and check if the audio information matches one of the specific sounds or words that is associated with an arming or disarming event. This may be contrasted with embodiments where audio information is passed to a remote server (such as a server of computing system 202) for further analysis. Because no information would have to be recorded and passed to a remote server, customer privacy could be enhanced. Whether sounds or words associated with an arming/disarming event can be detected by processes running on a local computing device vs. processes running on a server may depend on the complexity of the machine learning system used to process and identify sounds and words.

Figure 7:
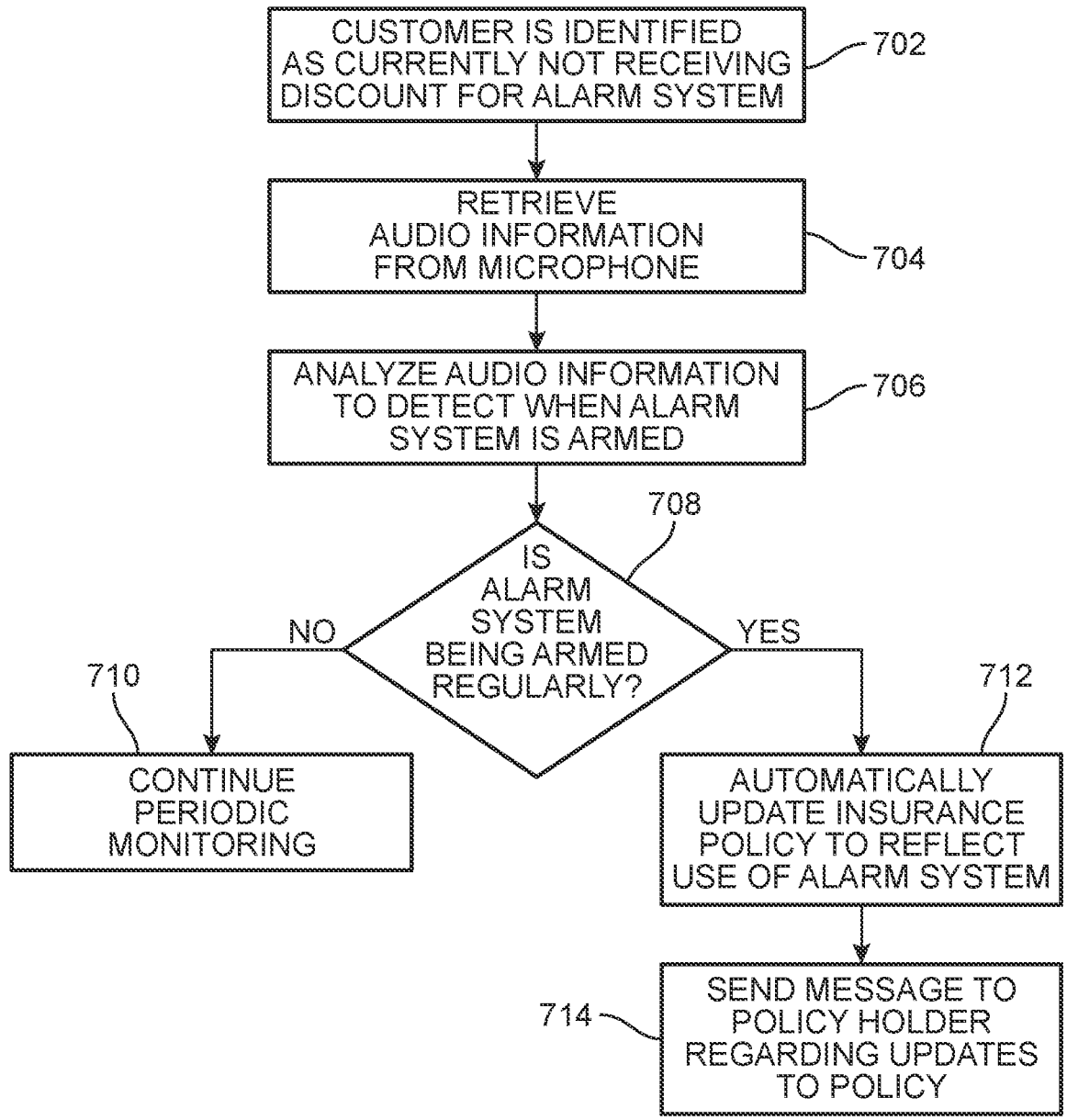
FIG. 7 is a schematic view of a process for automatically updating an insurance policy in response to detecting alarm arming events, according to an embodiment.

FIG. 7 is a schematic process for automatically detecting if an alarm system is being used, where the process is intended for a policy holder who is not currently receiving a discount for using an alarm system. In many cases, the presence and use of an alarm system may be determined when a new insurance policy is created. However, in some circumstances this information may not be provided, or the alarm system could be installed/activated after the initial insurance policy has been created. The exemplary process of FIG. 7 provides a method of automatically updating an insurance policy in response to detecting alarm use through sensed information.

In step 702, a computing system identifies a policy holder as currently not receiving a discount for using their alarm system. In the exemplary embodiment, step 704, step 706, step 708 and step 710 may proceed as step 504, step 506, step 508 and step 510, respectively, of the process shown in FIG. 5. That is, the computing system may retrieve audio information, analyze that information and determine if the system is being armed sufficiently frequently (or regularly).

However, in the present process, the computing system may take action to automatically change an insurance policy in response to detecting the use of the alarm system. Thus, if the computing system detects that the alarm system is being armed regularly, it may proceed to step 712.

In step 712, the computing system may automatically update the insurance policy for the premises to reflect that there is an alarm system on the premises that is being used sufficiently frequently. In some cases, the computing system can automatically the insurance policy premium and/or deductible to include a discount for use of an alarm system. Next, in step 714, the computing system may send a message to the policy holder to inform him or her of the updates to the policy.

In some embodiments, a provider may receive sensory information from one or more electrical sensors. The electrical sensors could be connected to one or more components of an alarm system. Exemplary alarm system components that might be connected to an electrical sensor include, but are not limited to: motion sensors, indoor and outdoor cameras, glass break detectors, door and window sensors, alarm speakers, alarm lights, control panels, and electronic locks. Based on the sensed electrical information, the computing system could then determine if the alarm system is being used and/or monitored (as in step 102 and step 104 of the process of FIG. 1). The system could further update the insurance policy and/or provide messages to a user (as in step 106 and step 108 of the process of FIG. 1).

The various methods described above for determining if an alarm system is being armed with sufficient frequency can also be used to determine if the alarm system is being disarmed with sufficient frequency. This include identifying a set of key words, phrases or noises that are associated with an alarm disarming event.

In some embodiments, a provider may want to know if an alarm system is being actively monitored. Active monitoring comprises a process where a third party (typically a company that specializes in monitoring alarm systems) responds to an alarm by calling the homeowner and/or a rescue service.

It may be appreciated that the various systems and methods described above for detecting alarm arming events may also be used to detect monitoring in some situations. Specifically, if the monitoring process includes calling a homeowner through an alarm system control unit or on their cell phone, it may be possible to detect these calls and confirm active monitoring. As with detecting alarm arming events, detecting active monitoring may include analyzing audio information and detecting key words, phrases or other audible sounds that can be used to infer an ongoing call with a monitoring company.

In some embodiments, it may be difficult to determine if a system is being monitored using sensory information. In such cases, it may be possible for an insurance provider to communicate directly with a monitoring company to determine if a customer's alarm system is being monitored.

Figure 8:
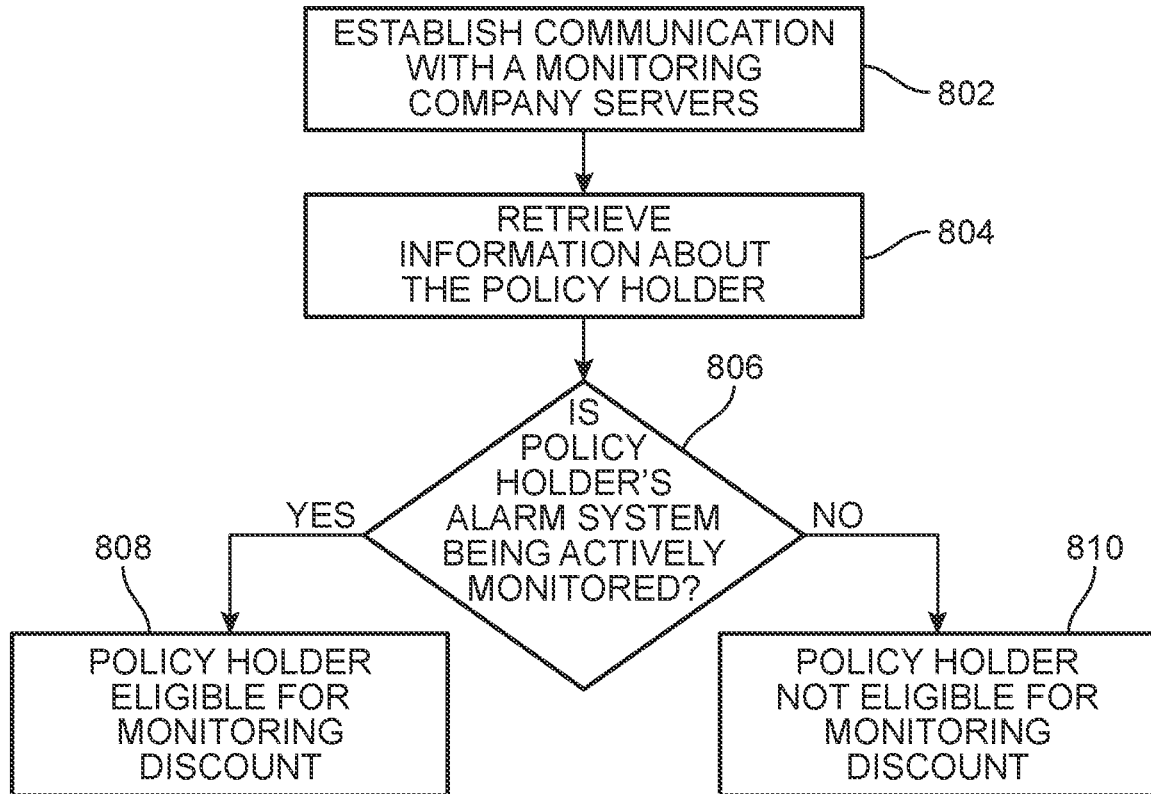
FIG. 8 is a schematic view of a process for retrieving monitoring information for an alarm system, according to an embodiment.

FIG. 8 depicts a schematic process for retrieving monitoring information directly from a third party, rather than inferring this information using sensors. In step 802, the computing system may establish communication with servers of a monitoring company. In some cases, the policy holder may provide the name of the monitoring company to the insurance provider so the insurance company can independently check the monitoring status.

Next, in step 804, the computing system may retrieve information about the policy holder. In some cases, this may require that the policy holder pre-authorizes such requests so the monitoring company can provide the requested information to the insurance provider.

In step 806, the provider determines if the policy holder's alarm system is being actively monitored based on the retrieved information from step 804. If so, the system proceeds to step 808 where the system determines the policy holder is eligible for a monitoring discount. Otherwise, in step 810, the system determines the policy holder is ineligible for the monitoring discount.

Figure 9:
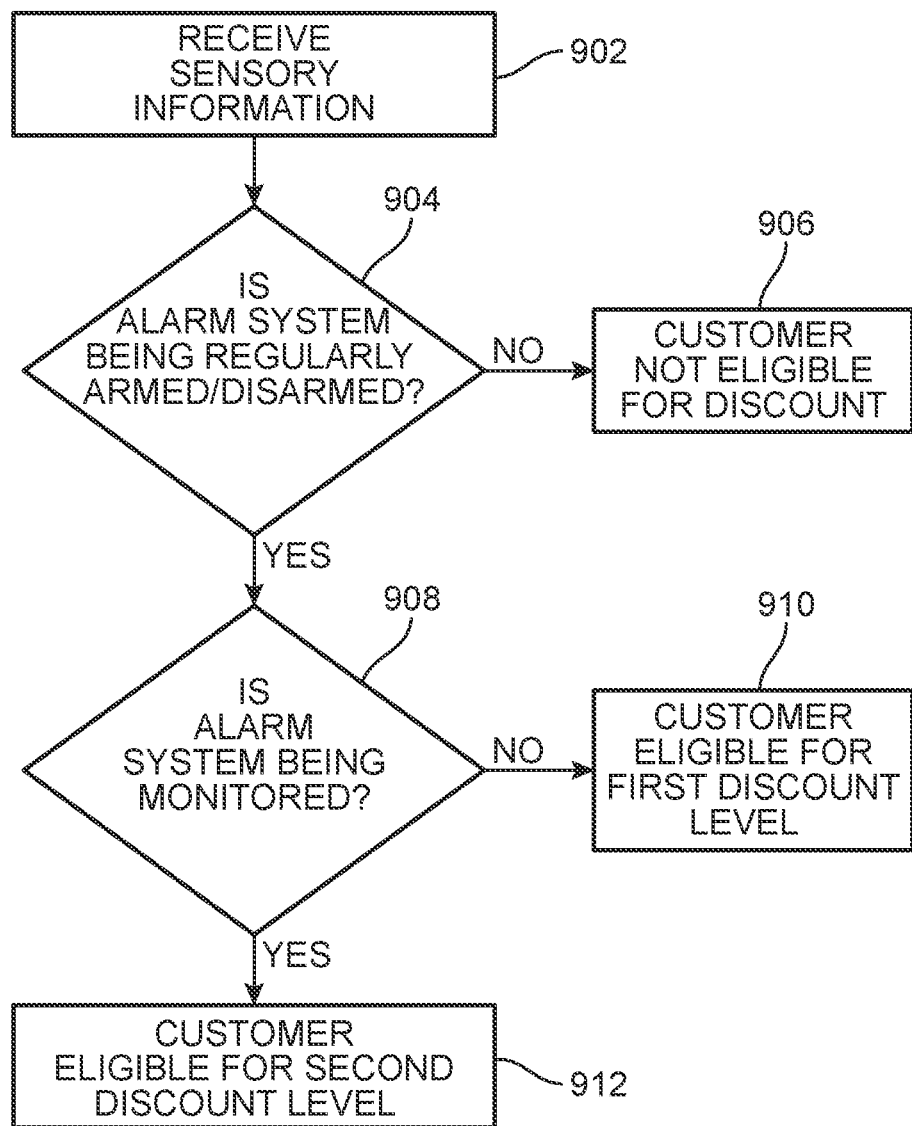
FIG. 9 is a schematic view of a process for determining a discount level for an insurance policy according to whether an alarm system for a premises is used and monitored.

FIG. 9 is a schematic view of a process for determining if a customer is eligible for a discount according to whether they are regularly using their alarm system and/or whether is system is being actively monitored. In the exemplary embodiment, the provider may give different levels of discount to customer's according to alarm use and also alarm monitoring. In step 902, the system analyzes sensory information. The sensory information could include audio information from one or more microphones, motion information from one or more motion sensors, electrical information from one or more electrical sensors, or any other suitable kinds of sensory information.

Next, in step 904, the computing system determines if the alarm system is being regularly armed and disarmed (that is, regularly used) using any of the analyses described in the embodiments. Regular use of the alarm system may be defined as a minimum number of uses over a predetermined period, such as once per day, once per week or once per month. The exact minimum number of uses per period can vary according to the provider's preferences.

If the alarm system is not being regularly used, the computing system may proceed to step 906. At this point, the customer is deemed ineligible to receive a discount for having and using an alarm system.

If, at step 904, the computing system determines that the alarm system is being regularly used, it may proceed to step 908. In step 908, the system determines if the alarm system is being actively monitored by a third party (such as a monitoring company). If not, the system proceeds to step 910. At this point, the system determines that the customer is eligible for a first discount level provided to customers who use their alarm system (that is, arm and disarm it) regularly, but who do not have the system actively monitored by a third party who can call the police, fire department or other rescue workers once an alarm has been triggered.

If, in step 908, the computing system determines that the alarm system is being monitored it may proceed to step 912. In step 912, the computing system determines that the customer is eligible for a second discount level provided to customers who regularly use their alarm system and who also have the alarm system monitored. In some cases, this second discount level may be greater than the first discount level, as using an actively monitoring the alarm system provides increased risk mitigation compared to using an unmonitored system.

Figure 10:
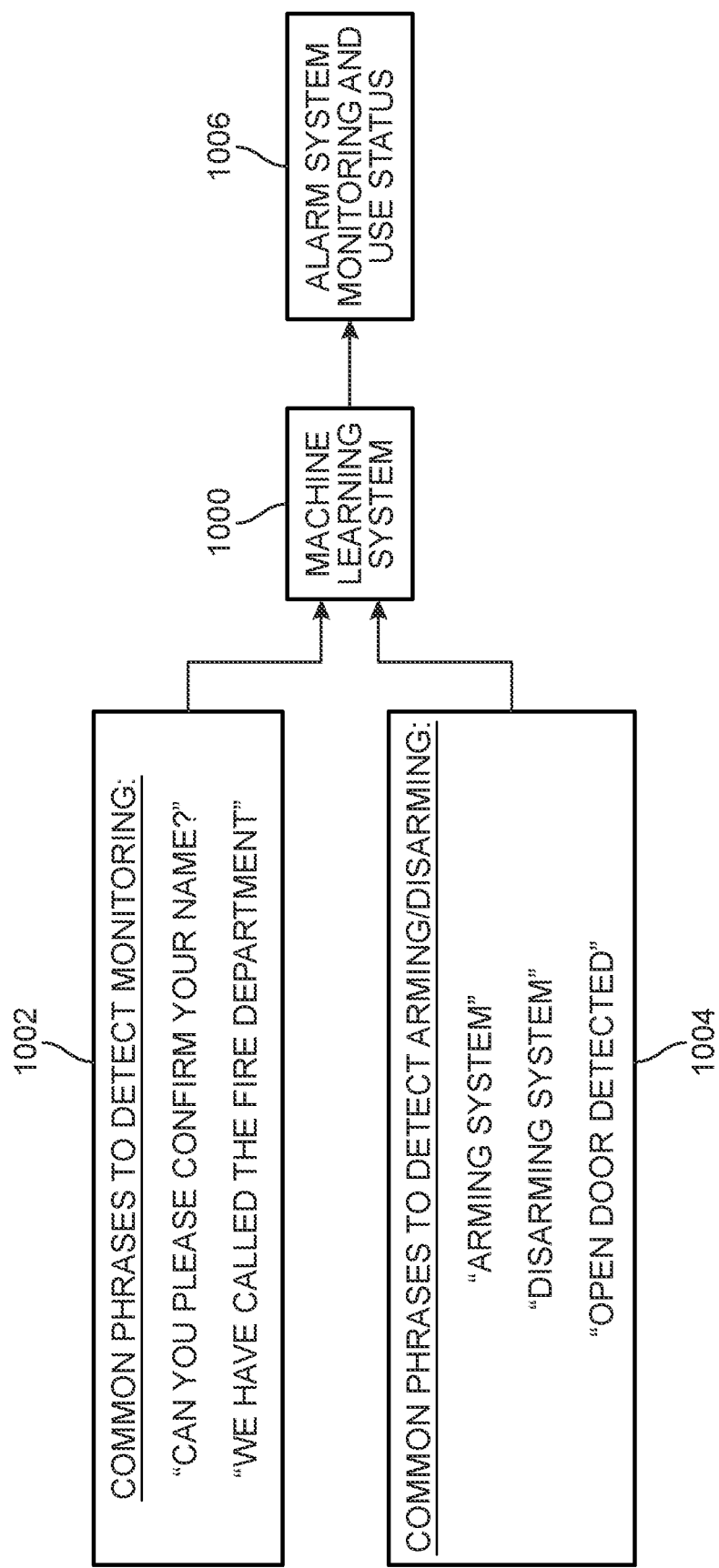
FIG. 10 is a schematic view of a configuration for training a machine learning system to detect alarm use and monitoring.

FIG. 10 is a schematic view of a machine learning system 1000 that may be used to determine if an alarm system is being used and/or monitored. In the example of FIG. 10, machine learning system 1000 is trained on input data 1002. The type of input data used for training may depend on the type of sensory data available during operation of the system. For example, if the system has access to one or more microphones to detect audio information, the training data may be audio data. If the system has access to motion sensors to detect motion information, the training data may be motion sensor information. If the system has access to electrical sensors to detect electrical information, the training data may be electrical information.

In the exemplary embodiment of FIG. 10, audio data is used as training data. The audio data may be configured as two types: data for detecting use (or arming and disarming) and data for detecting monitoring. For example, in FIG. 10 a first type of training data 1002 includes audio information corresponding to common words or phrases that the system would expect to hear when the alarm system is actively monitored and an alarm is triggered. A second type of data 1004 includes audio information corresponding to common words or phrases that the system would expect to hear when the alarm system is being armed or disarmed.

The output 1006 of the system provides the alarm system monitoring and use status. For example, if alarm system is being used but not monitored, the output may be "Use: True; Monitoring: False", or some similar representation of the predicted state of the alarm system.

In some embodiments, the input to the machine learning system could be audio information. However, in other embodiments, the audio information could first be converted into written words using speech recognition algorithms, before being processed by the machine learning system.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A system for detecting use of an alarm system associated with a premises, the system comprising:
a centralized computer system of a provider;
a microphone located on the premises;
wherein the centralized computer system of the provider is configured to:
obtain audio information from the microphone located on the premises, wherein the centralized computer system is located remotely from the premises and the audio information is obtained from the microphone through a network;
analyze the obtained audio information to detect an alarm arming event at the premises, wherein the alarm arming event is when the alarm system associated with the premises transitions between an unarmed state and an armed state;
wherein analyzing the obtained audio information includes detecting, by an artificial intelligence algorithm using natural language processing techniques, at least one key word or phrase associated with a verbal announcement generated by the alarm system and output through a speaker of the alarm system upon initiation of the alarm arming event;
compare a number of alarm arming events over a predetermined time to a threshold frequency; and upon determining that the number of alarm arming events detected within the predetermined time is less than the threshold frequency, send a message to an owner of the premises, wherein the message includes a reminder to use the alarm system.

2. The system according to claim 1, wherein the premises are associated with an insurance policy from the provider; and
wherein the message includes information about insurance premium discounts associated with a frequency of use of the alarm system.

3. The system according to claim 1, wherein the microphone is associated with an intelligent voice assistant located on the premises.

4. The system according to claim 1, wherein the microphone is associated with a user device that is carried onto the premises.

5. The system according to claim 4, wherein the user device comprises one of a smartphone, a tablet computing device, or a laptop computer.

6. The system according to claim 4, wherein the message is sent to the user device.

7. The system according to claim 1, wherein the centralized computer system of the provider is further configured to:
retrieve monitoring information associated with the alarm system from a third party monitoring company that provides active monitoring for the alarm system at the premises.

8. The system according to claim 7, wherein the premises are associated with an insurance policy from the provider; wherein the centralized computer system of the provider is further configured to:
determine that the premises are being actively monitored based on the monitoring information received from the third party monitoring company; and
upon determining that the premises are being actively monitored, provide a discount to the owner of the premises on the insurance policy.

9. A system for detecting use of an alarm system associated with a premises, the system comprising:
a computing device including a processor;
a microphone located on the premises;
wherein the processor of the computing device is configured to:
obtain audio information from the microphone located on the premises;
analyze the obtained audio information to detect an alarm arming event, wherein the alarm arming event is when the alarm system associated with the premises transitions between an unarmed state and an armed state;
detect, using natural language processing techniques on the obtained audio information, at least one key word or phrase associated with a verbal announcement generated by the alarm system and output through a speaker of the alarm system upon initiation of the alarm arming event;
compare a number of alarm arming events over a predetermined time to a threshold frequency; and
upon determining that the number of alarm arming events detected within the predetermined time is less than the threshold frequency, send a message to an owner of the premises, wherein the message includes a reminder to use the alarm system.

10. The system according to claim 9, wherein the microphone is associated with an intelligent voice assistant located on the premises.

11. The system according to claim 9, wherein the computing device is located on the premises and is connected to the microphone.

12. The system according to claim 9, wherein the computing device communicates with a centralized computing system of a provider of an insurance policy associated with the premises through a network.

13. The system according to claim 12, wherein the message includes information about insurance premium discounts for the insurance policy associated with a frequency of use of the alarm system.

14. The system according to claim 9, further comprising:
at least one electrical sensor connected to at least one component of the alarm system; and
wherein the processor of the computing device is further configured to:
obtain electrical activity information from the at least one electrical sensor; and analyze the obtained electrical activity information to detect when the alarm system is placed in the armed state.

15. The system according to claim 9, further comprising:

a motion sensor disposed proximally to an entrance of the premises;

wherein the processor of the computing device is further configured to obtain sensory information from the motion sensor; and wherein the audio information from the microphone is obtained only in response to obtaining the sensory information from the motion sensor indicating that a person has entered or exited the premises.

16. A method of training a machine learning system to detect use of an alarm system associated with a premises, the method comprising:

providing audio input data to an artificial intelligence algorithm using natural language processing techniques, wherein the audio input data includes audio information corresponding to a plurality of key words or phrases associated with a verbal announcement generated by the alarm system and output through a speaker of the alarm system upon initiation of an alarm arming event, wherein the alarm arming event is when the alarm system associated with the premises transitions between an unarmed state and an armed state; and wherein the artificial intelligence algorithm using natural language processing techniques is configured to analyze audio information obtained from a microphone located on the premises to detect at least one key word or phrase from the plurality of key words or phrases associated with the verbal announcement generated by the alarm system and output through the speaker of the alarm system upon initiation of the alarm arming event.

17. The method according to claim 16, wherein the audio input data further comprises audio information corresponding to a plurality of key words or phrases associated with active monitoring of the alarm system when an alarm is triggered.

18. The method according to claim 17, wherein the artificial intelligence algorithm using natural language processing techniques is configured to analyze audio information obtained from the microphone located on the premises to detect at least one key word or phrase from the plurality of key words or phrases associated with active monitoring of the alarm system when the alarm is triggered.

19. The method according to claim 18, wherein the machine learning system is configured to provide an output of: (1) an alarm monitoring status, and (2) an alarm use status.

20. The method according to claim 16, further comprising:

providing at least one of motion sensor information or electric information as training data to the machine learning system.

\* \* \* \* \*